(No Model.)
R. S. WILSON.
COFFEE POT.
No. 249,565. Patented Nov. 15, 1881.
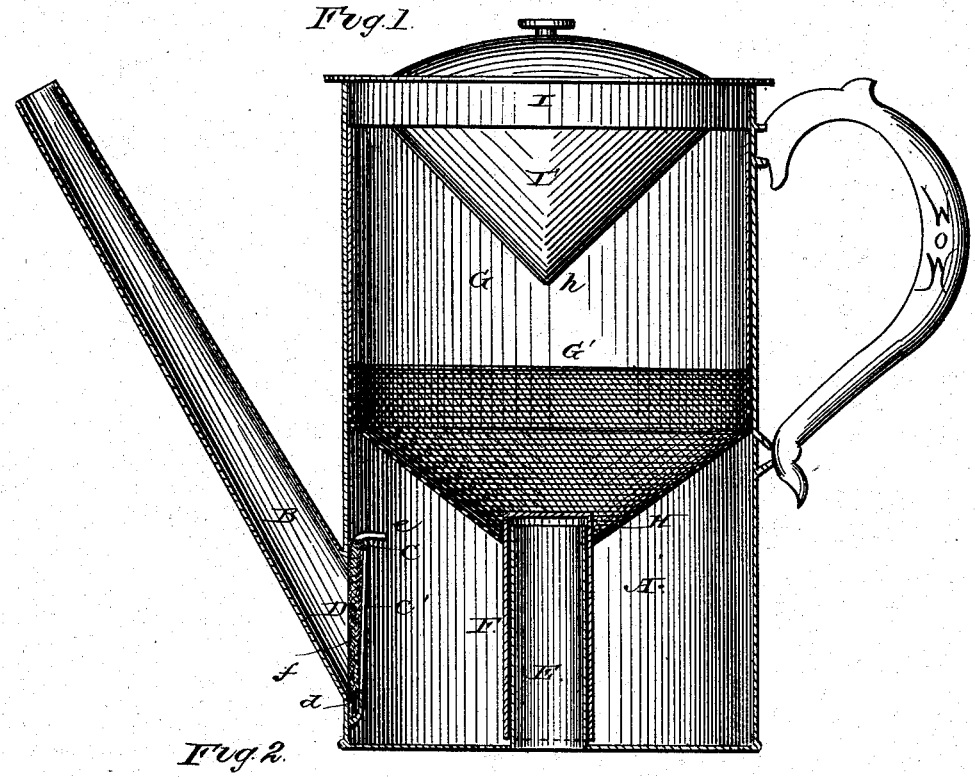
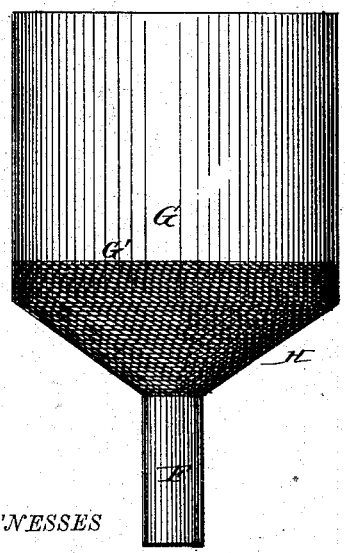
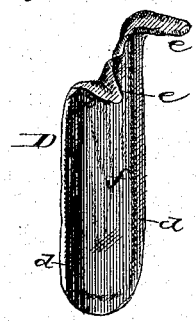
WITNESSES
Fred. G. Dieterich
John H. Madigan
INVENTOR
Robert S. Wilson
By his Attorneys
Louis Bagger & Co.

UNITED STATES PATENT OFFICE.

ROBERT S. WILSON, OF SPRINGFIELD, MISSOURI.

COFFEE-POT.

SPECIFICATION forming part of Letters Patent No. 249,565, dated November 15, 1881.

Application filed May 16, 1881. (No model.)

*To all whom it may concern:*

Be it known that I, ROBERT S. WILSON, of Springfield, in the county of Greene and State of Missouri, have invented certain new and useful Improvements in Coffee-Pots; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section. Fig. 2 is a side view of the coffee (or tea) receptacle detached. Fig. 3 is a perspective view of the spring-filter detached, and Fig. 4 is a similar view of the filter-wire with the strainer-cloth removed.

Similar letters of reference indicate corresponding parts in all the figures.

My invention contemplates certain improvements in pots or boilers for making tea or coffee, as hereinafter described, and particularly pointed out in the claims.

In the annexed drawings, A is a pot or vessel of cylindrical shape and suitable size, by preference large enough to hold a gallon and a half, as I have found that the best results are obtained with pots or boilers of comparatively large capacity.

B is the spout, in front of which, on the inside of the pot, is a shield, C, having a central opening, C', to admit the contents of the pot to pass into the spout.

D is a removable strainer, which is inserted into the narrow space between the base of the spout and the shield C, which keeps it in place. This strainer is composed of a piece of wire, $d$, which is bent into a horseshoe shape, (see Fig. 4,) with its ends $e$ $e$ bent at right angles to form finger-holds for removing or inserting it.

$f$ is the strainer-cloth or filter, which is held by and between the arms of the wire, the spring tension of which holds the strainer firmly in its place at the base of the spout, within the pot, and yet permits of its ready removal when desired for cleaning or other purposes.

In the center of the bottom of the pot is a short tubular standard, E, over which is slipped the sleeve F of the removable tea or coffee receptacle. The latter consists of a cylinder, G, having a tapering or funnel-shaped bottom, H, of foraminated sheet-metal or wire-gauze, the foraminated bottom forming a narrow band around the lower part of the cylinder, as shown at G'.

I is the cover, the bottom of which, I', is of the shape of an inverted cone, with its point or apex $h$ over the center of the coffee holder or receptacle G G' H.

The tubular standard E in the bottom of the pot not only serves as a support for the coffee-holder, but as a conductor and distributer of the heat to the water which surrounds it. It will also be seen that the tube or sleeve F of the coffee-holder extends a short distance up into the foraminated funnel H, which prevents "packing" of the ground coffee or tea in the center, and gives the boiling water a better chance to permeate the entire mass. The steam, as it rises through the pot, is condensed upon the cone I', and drips back from the point $h$ into the center of the receptacle below, percolating its contents, so as to thoroughly absorb all flavor and aroma, and then escapes through the foraminated part G' H into the bottom of the pot, the strainer D effectually preventing any grounds or sediment from entering the spout.

Having thus described my invention, I claim and desire to secure by Letters Patent of the United States—

1. The coffee holder or receptacle composed of the cylinder G G' and foraminated funnel-shaped bottom H, having central downward-projecting sleeve F, extending at its upper closed end into the funnel, as set forth.

2. The combination of the coffee holder or receptacle G G' H F, constructed as described, cylindrical pot or boiler A, having spout B, and central tubular standard, E, and cover I I', tapering on its under side to a central point, $h$, as set forth.

3. The removable strainer composed of the wire $d$ and strainer-cloth $f$, constructed as described, in combination with the pot or boiler A, having spout B and perforated shield C, substantially as and for the purpose herein shown and set forth.

In testimony that I claim the foregoing as my own I have hereunto affixed my signature in presence of two witnesses.

ROBERT SAMUEL WILSON.

Witnesses:
J. H. WILKS,
FRANK CULBERTSON.